United States Patent Office 3,037,993
Patented June 5, 1962

3,037,993
AMIDO- AND IMIDOPHENYL
METHYLCARBAMATE
Alexander T. Shulgin, Berkeley, Calif., assignor to The
Dow Chemical Company, Midland, Mich., a corporation of Delaware
No Drawing. Filed June 17, 1960, Ser. No. 36,719
5 Claims. (Cl. 260—326)

This invention is concerned with amido- and imidophenyl methylcarbamates having the formula X—Ar—OCONHCH$_3$ wherein Ar represents a divalent aromatic radical of the benzene series and X represents an acylated amino radical containing from 1 to 8 carbon atoms, inclusive. By "divalent aromatic radical of the benzene series" is meant a phenylene radical which may be further substituted by neutral, i.e., non-acidic or non-basic, radicals. By "acylated amino radical" is meant an acid amido radical or an acid imido radical. The acid amido radical may be represented by

ACONH— wherein A is hydrogen, alkyl containing from 1 to 7 carbon atoms, inclusive, phenyl or tolyl. The acid imido radical may be represented by

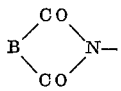

where B is alkylene or alkenylene radical wherein the chain length is from 2 to 3 carbon atoms, inclusive, or is o-phenylene.

The compounds of the present invention are crystalline solids soluble in many organic solvents such as benzene, toluene, xylene, methylene chloride, methanol, ethanol, isopropyl alcohol and carbon tetrachloride and substantially insoluble in water.

The products of the present invention are useful as toxic components of parasiticide compositions. As such, they are adapted to be employed for the control of insects, internal parasites, bacteria and fungi. Certain of these compounds are also useful as herbicides for the control of undesirable plants and weeds.

The compounds of particular interest are those represented by the formula

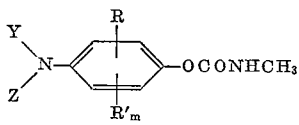

In this and succeeding formulas, R represents hydrogen or alkyl containing from 1 to 4 carbon atoms, inclusive, each R' is independently selected from the group consisting of hydrogen, methyl and ethyl, m is an integer of from 1 to 2, inclusive,

represents an acid amido containing from 1 to 8 carbon atoms, inclusive, or an acid imido radical containing from 4 to 8 carbon atoms, inclusive, wherein in said acid imido radical Y and Z are joined together with the nitrogen to form a cyclic imido structure.

The compounds of the present invention may be prepared (1) by the reaction of an appropriate aminophenol with an acid compound, namely, an acid or acid anhydride to produce an intermediate amido- or imidophenol compound having the structure

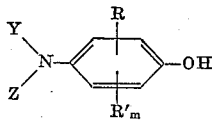

followed by (2) the reaction of the latter with methyl isocyanate. The aminophenol reactant may be employed as its hydrohalide, i.e., hydrochloride or hydrobromide, salt. The choice of the acid compound reactant, i.e., acid or acid anhydride, depends in part on the ready availability of the acid reactant. Generally, either derivative produces desirable results.

Inclusive of the acid compounds suitable for the preparation of the amido- and imidophenyl methylcarbamates of the present invention are formic acid, acetic acid, propionic acid, normal-butyric acid, isobutyric acid, normal-valeric acid, caproic acid, trimethylacetic acid, normal-heptylic acid, caprylic acid, isomeric toluic acids, benzoic acid, phthalic acid, succinic acid, maleic acid, glutaric acid, glutaconic acid, citraconic acid, itaconic acid, dimethylmaleic acid, ethylmaleic acid, methylethylmaleic acid, diethylmaleic acid and the corresponding acid anhydrides.

Suitable aminophenols for the practice of the present invention include 4-aminophenol, 4-amino-m-cresol, 4-amino-3-tertiary-butylphenol, 4 - amino-3,5-xylenol, 4-amino-2,6-xylenol, 4-amino-2,5-xylenol, 4-amino-3-methyl-5-ethylphenol, 4-amino-2,3,5-trimethylphenol, 4-amino-2,3,6-trimethylphenol, 4 - amino-3,5-diethylphenol, 4-amino - 3 - isopropylphenol, 4-amino-3-ethylphenol, 4-amino-3-isobutylphenol, 4-amino-3-normal-propylphenol, 4-amino-o-cresol, 4-amino-6-ethyl-2,3-xylenol, 4-amino-2,3,5-triethylphenol, 4-amino-5,6-diethyl-m-cresol and 4-amino-2-ethyl-3,5-xylenol.

The first step of the reaction is carried out by heating together the appropriate aminophenol or its hydrohalide salt with an appropriate acid or anhydride. The reaction is usually carried out in the presence of a solvent or liquid reaction medium although where the acidic reactant is a solid cyclic anhydride or a solid monobasic acid, the reactants may be fused together. Usually an excess of the appropriate acid or anhydride is employed, the acid or anhydride functioning as solvent as well as reactant. However, equimolar proportions of the reactants may be employed with added inert solvents, if desired. The reaction takes place over a period of from about 2 minutes to about 24 hours in the temperature range of from about 15° to about 400° C. with the formation of an intermediate amido- or imidophenol compound. The latter is recovered and purified, if desired, by conventional procedures.

In one mode for carrying out the first step when an acid amido derivative is to be prepared, and the preferred method for the preparation of the formamido derivatives, one molar proportion of the appropriate aminophenol and an excess on the molar basis of the free acid are heated together. When the acid reactant is not a liquid, the reaction is carried out in a solvent. Suitable solvents include benzene, toluene and xylene. The mixture is heated for about 0.5 to 4 hours, usually at the reflux temperature of the solvent or the liquid reactant to obtain an acid amidophenol intermediate. The latter is a solid which separates as a precipitate if solvent is employed or may be recovered as a solid residue. The intermediate may thereafter be purified, if desired, by washing decolorizing a solution thereof with activated charcoal and/or by recrystallization. Suitable solvents for recrystallization include methanol, ethanol, isopropyl alcohol and alcohol-water combinations.

In another modification for carrying out the first step, the appropriate acid anhydride is added to an aqueous solution of the appropriate aminophenol as its hydrohalide. (The latter is prepared by dissolving the appropriate aminophenol in sufficient dilute hydrohalic acid to maintain the aminophenol in solution as its hydrohalic acid salt or by dissolving the hydrochloride or hydrobromide salt of the aminophenol in water.) The reaction mixture is agitated to insure complete dispersion of the acid anhydride and allowed to react at a temperature of from about 20° to 60° C. for a period of from about 0.25 to 2 hours. At the end of this period, sodium acetate is added to the reaction mixture whereupon an acid amidophenol intermediate precipitates as a solid or an oil. The sodium acetate may be added as a solid or as an aqueous solution over a period of from about 5 minutes to 30 minutes. The acid amidophenol intermediate may be recovered from the reaction mixture by conventional procedures such as filtration, decantation or extraction with an appropriate water-insoluble solvent such as methylene chloride and thereafter purified as previously described.

In an alternative method for carrying out the first step and preferred for preparing an acid imidophenol intermediate, substantially equimolar proportions of the appropriate solid cyclic anhydride and solid aminophenol are mixed together and heated at fusion temperature for from about 2 to 15 minutes whereupon a reaction takes place with the evolution of water and the formation of an acid imidophenol intermediate. The latter may be purified as previously described.

In the second step for carrying out the preparation of the compounds of the invention, a substantially equimolar proportion or an excess of methyl isocyanate is mixed together and reacted with an acid amido- or imidophenol intermediate prepared as above described at a temperature of from 0° to 40° for a period of from 0.5 to 48 hours. The reaction is preferably carried out in the presence of a catalyst and a solvent. Suitable catalysts include triethylamine, pyridine, picoline and collidine. A suitable amount of catalyst is considered to be about 3 to 4 drops per gram of amido- or imidophenol employed although frequently larger amounts are desirable. Preferred solvents are methylene chloride and dimethylformamide. Alternatively, the reaction may be carried out in excess triethylamine, pyridine, picoline or collidine, said bases functioning both as a catalyst and as a solvent. Still another modification is heating the reactants together in a closed vessel in the temperature range of from about 50° to 75° C. As a result of these operations, the desired acid amido- or imidophenyl methylcarbamate product is formed. The latter usually precipitates in the reaction mixture but may remain in solution. The product may be recovered by conventional procedures. Thus, if it precipitates as a solid, it may be recovered by filtration; if it remains in solution, it may be recovered by evaporating or distilling off the solvent, or by flooding the solvent (if water miscible) with water to precipitate the product, followed by filtration. The product may then be purified, if desired, by washing or decolorizing with activated charcoal and by recrystallization from a suitable solvent such as cyclohexane, methanol, ethanol, isopropyl alcohol and alcohol-water combinations.

The following examples illustrate the invention but are not to be construed as limiting.

EXAMPLE 1

*4-Formamido-3,5-Xylyl Methylcarbamate*

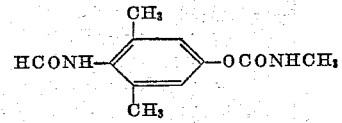

27.4 grams (0.20 mole) of 4-amino-3,5-xylenol was dissolved in 100 milliliters of 90 percent formic acid and the resulting mixture was brought to a boil and heated at reflux temperature for one hour. Water was added to the hot solution to initiate the precipitation of the 4-formamido-3,5-xylenol intermediate. After completion of the precipitation of the intermediate as a crystalline solid, it was recovered by filtration and purified by treating an aqueous solution thereof with activated charcoal and recrystallizing from water. The purified 4-formamido-3,5-xylenol intermediate was fluffy white crystals melting at 233° C.

About 2.0 milliliters (0.035 mole) of methyl isocyanate and a few drops of triethylamine catalyst were added to a solution of 5 grams (0.0305 mole) of the above prepared 4-formamido-3,5-xylenol intermediate in 30 milliliters of dimethylformamide. The resulting orange solution was allowed to stand for a day at room temperature and the solvent then removed under reduced pressure to obtain a 4-formamido-3,5-xylyl methylcarbamate product as residue. The latter was washed with methylene chloride to obtain a purified product as a white powder melting from 202° to 205° C.

*Example 2*

In preparations carried out in a manner similar to that described in Example 1, the following compounds were prepared:

4-formamidophenyl methylcarbamate as purple crystals melting from 132° to 134° C. by the reaction of formic acid with 4-aminophenol to produce an intermediate 4-formamidophenol followed by the reaction of the latter with methyl isocyanate.

3-tertiary-butyl-4-formamidophenyl methylcarbamate as a white solid melting from 174° to 178° C. by the reaction of formic acid with 4-amino-3-tertiary-butylphenol to produce an intermediate 3-tertiary-butyl-4-formamidophenol followed by the reaction of the latter with methyl isocyanate.

4-formamido-2,6-xylyl methylcarbamate as a white crystalline solid melting at 168°–169° C. by the reaction of formic acid with 4-amino-2,6-xylenol to produce an intermediate 4-formamido-2,6-xylenol followed by the reaction of the latter with methyl isocyanate.

4-formamido-3-ethyl-5-methylphenyl methylcarbamate as a white solid melting from 163.5° to 165° C. by the reaction of formic acid with 4-amino-3-ethyl-5-methylphenol to produce an intermediate 4-formamido-3-ethyl-5-methylphenol followed by the reaction of the latter with methyl isocyanate.

4-formamido-2,3,5-trimethylphenyl methylcarbamate as a white solid melting at 226°–227° C. by the reaction of formic acid with 2,3,5-trimethylphenol to produce an intermediate 4-formamido-2,3,5-trimethylphenol followed by the reaction of the latter with methyl isocyanate.

EXAMPLE 3

*4-Acetamido-3,5-Xylyl Methylcarbamate*

27.4 grams (0.20 mole) of 4-amino-3,5-xylenol was dissolved in 500 milliliters of dilute hydrochloric acid (from 16.5 ml. conc. HCl plus water to 500 ml.), the mixture warmed to 50° C. and 23.5 milliliters (0.20 mole) of acetic anhydride added thereto. Thereafter, a solution of 30 grams of sodium acetate·trihydrate in 100 milliliters of water was added to the mixture with stirring, and the mixture then allowed to cool to room temperature with continued stirring over a period of three hours. The mixture was then maintained in the cold room (32° F.) overnight to obtain a 4-acetamido-3,5-xylenol intermediate as a flaky, light brown hydrated solid. The latter was decolorized by treating a boiling water solution thereof with activated charcoal and then allowed to cool to obtain crystals of a monohydrate. The water was removed azeotropically with benzene to obtain a purified 4-acetamido-3,5-xylenol intermediate as a granular white solid melting from 179° to 181° C.

1.6 milliliters (0.028 mole) of methyl isocyanate and two drops of triethylamine were added to a solution in dimethylformamide of 4 grams (0.022 mole) of 4-acetamido-3,5-xylenol intermediate above prepared. There was a slight exothermic reaction, but no external cooling was necessary. In one-half hour, crystals of 4-acetamido-3,5-xylyl methylcarbamate product started to form. The mixture was allowed to stand overnight to complete the precipitation of the product, the latter then filtered off, washed with hexane and air dried to obtain 3.8 grams of a purified product as white crystals melting from 199° to 201° C.

EXAMPLE 4

In preparations carried out in a manner similar to that described in Example 3, the following compounds are prepared:

4-benzamido-3-tolyl methylcarbamate by the reaction of benzoic acid and 4-amino-m-cresol to produce an intermediate 4-benzamido-m-cresol followed by the reaction of the latter with methyl isocyanate.

4-benzamido-2-tolyl methylcarbamate by the reaction of benzoic acid with 4-amino-o-cresol to produce an intermediate 4-benzamido-o-cresol followed by the reaction of the latter with methyl isocyanate.

4-(o-toluamido)-3-tolyl methylcarbamate by the reaction of o-toluic acid with 4-amino-m-cresol to produce an intermediate 4-(o-toluamido)-m-cresol followed by the reaction of the latter with methyl isocyanate.

4-(p-toluamido)-3-tolyl methylcarbamate by the reaction of p-toluic acid with 4-amino-m-cresol to produce an intermediate 4-(p-toluamido)-m-cresol followed by the reaction of the latter with methyl isocyanate.

4-normal-butyramido-3,5-xylyl methylcarbamate by the reaction of normal-butyric anhydride with 4-amino-3,5 xylenol to produce an intermediate 4-normal-butyramido-3,5-xylenol followed by the reaction of the latter with methyl isocyanate.

4-normal-valeramidophenyl methylcarbamate by the reaction of normal-valeric anhydride with 4-aminophenol to produce an intermediate 4-normal-valeramidophenol followed by the reaction of the latter with methyl isocyanate.

4-normal-caproamido-m-tolyl methylcarbamate by the reaction of normal-caproic acid with 4-amino-m-cresol to produce an intermediate 4-caproamido-m-cresol followed by the reaction of the latter with methyl isocyanate.

4-capramidophenyl methylcarbamate by the reaction of caprylic acid with 4-aminophenol to produce an intermediate 4-capramidophenol followed by the reaction of the latter with methyl isocyanate.

4-isobutyramido-3,5-diethylphenyl methylcarbamate by the reaction of isobutyric acid with 4-amino-3,5-diethylphenol to produce an intermediate 4-isobutyramido-3,5-diethylphenol followed by the reaction of the latter with methyl isocyanate.

4-acetamido-2,3,6-trimethylphenyl methylcarbamate by the reaction of acetic anhydride with 4-amino-2,3,6-trimethylphenol to produce an intermediate 4-acetamido-2,3,6-trimethylphenol followed by the reaction of the latter with methyl isocyanate.

4 - normal - heptanamido - 2-ethyl-3,5-xylyl methylcarbamate by the reaction of normal-heptylic acid with 4-amino-2-ethyl-3,5-xylenol to produce an intermediate 4-normal-heptanamido-2-ethyl-3,5-xylenol followed by the reaction of the latter with methyl isocyanate.

4 - benzamido - 3-isopropylphenyl methylcarbamate by the reaction of benzoic acid with 4-amino-3-isopropylphenol to produce an intermediate 4-benzamido-3-isopropylphenol followed by the reaction of the latter with methyl isocyanate.

EXAMPLE 5

*3 - Tertiary-Butyl-4-Phthalimidophenyl Methylcarbamate*

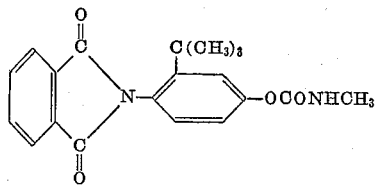

3.3 grams (0.02 mole) of 4-amino-3-tertiary-butylphenol and 2.96 grams (0.02 mole) of phthalic anhydride were mixed together and fused in a porcelain dish over the open flame of a Bunsen burner. A reaction took place with melting of the reactants and effervescence with evolution of water. After completion of the reaction as seen from a termination in the evolution of water, the mixture was allowed to cool to room temperature to obtain a 3-tertiary-butyl-4-phthalimidophenol intermediate as tan crystals melting at 210° C.

1.5 grams (0.005 mole) of the 3-tertiary-butyl-4-phthalimidophenol intermediate above prepared was dissolved in 30 milliliters of methylene chloride and 0.3 milliliters (0.0053 mole) of methyl isocyanate and 3 drops of triethylamine added thereto. The reaction mixture was allowed to stand at room temperature for 2 days. At the end of this period, the solvent was removed by evaporation to recover a 3-tertiary-butyl-4-phthalimidophenyl methylcarbamate product as residue. The product was recrystallized from a chloroform-hexane mixture to obtain a purified product melting from 186° to 187.5° C.

EXAMPLE 6

In similar preparations, the following compounds are prepared:

4-succinimidophenyl methylcarbamate by the reaction of 4-aminophenol and succinic anhydride to produce an intermediate 4-succinimidophenol followed by the reaction of the latter with methyl isocyanate.

4-maleimidophenyl methylcarbamate by the reaction of 4-aminophenol and maleic anhydride to produce an intermediate 4-maleimidophenol followed by the reaction of the latter with methyl isocyanate.

4-glutarimido-3,5-xylyl methylcarbamate by the reaction of glutaric anhydride with 3,5-xylenol to produce an intermediate 4-glutarimido-3,5-xylenol followed by the reaction of the latter with methyl isocyanate.

4 - phthalimido-2,3,5-trimethylphenyl methylcarbamate by the reaction of 4-amino-2,3,5-trimethylphenol and phthalic anhydride to produce an intermediate 4-phthalimido-2,3,5-trimethylphenol followed by the reaction of the latter with methyl isocyanate.

4-succinimido-3-ethyl-5-methylphenyl methylcarbamate by the reaction of 3-ethyl-5-methylphenol and succinic anhydride to produce an intermediate 4-succinimido-3-ethyl-5-methylphenol followed by the reaction of the latter with methyl isocyanate.

The compounds of the present invention are useful as pesticides. As household and agricultural pesticides, they give, for example, good control of ticks, flies, aphids, mites and insects when infested plants, animals or areas are sprayed with dispersions containing the compounds as toxic ingredients. They are also good residual insecticides wherein insects are controlled when plant surfaces previously sprayed with compositions containing amido- and imidophenyl methylcarbamate compounds thereafter become infested with aphids, mites and chewing insects.

The usefulness of the compounds as insecticides is noted against chewing-type insects as represented by Mexican bean beetle (*Epilachna varivestis*) and Southern army worm (*Prodenia eridania*). In representative operations for the control of chewing insects, 4-formamido-3,5-xylyl methylcarbamate, 3-tertiary-butyl-4-formamidophenyl methylcarbamate, 5-ethyl-4-formamido-m-tolyl methylcarbamate, 4-formamidophenyl methylcarbamate and 4-formamido-2,3,5-trimethylphenyl methylcarbamate were separately dispersed in water to prepare aqueous spray compositions containing 100 parts per million by weight of one of the methylcarbamates per million parts by weight of ultimate spray mixture. These compositions were separately applied to a series of cranberry bean plants in amounts sufficient to wet the foliage. The leaf surfaces were then allowed to dry and the plants infested with a known number of Mexican bean beetles. Three days after infestation, the plants were examined to ascertain the control of Mexican bean beetle attributable to the test compounds. It was found that in all cases, complete kills of Mexican bean beetle were observed.

The compounds are particularly outstanding as systemic insecticides against plant-feeding insects. In a representative operation for demonstrating such use, plants are separately immersed at the stems through a hole in containers in various aqueous dispersions containing 10 parts by weight per million parts of aqueous dispersion of the following methylcarbamates: 4-formamido-3,5-xylyl methylcarbamate, 3-tertiary-butyl-4-formamidophenyl methylcarbamate, 5-ethyl-4-foramido-m-tolyl methylcarbamate and 4-formamido-2,3,5-trimethylphenyl methylcarbamate. The dispersions are thus separated from the leaves to be secure from infestation. The leaves are then infested with aphids and two spotted spider mites. On inspection of the leaves after 7 days, complete controls of the mites and aphids were observed in each case.

The compounds of the present invention have also been found to be effective for the control of pests attacking warm-blooded animals. Thus, they may be employed for the control of helminths such as Bunostomum sp., Haemonchus sp., Oesophagostum sp., Ostertagi sp., Trichostrongulus sp. and Cooperia sp. In a representative operation as anthelmintic, complete controls of the above helminths were obtained when a composition containing 4-formamido-3,5-xylyl methyl-carbamate was applied at a rate of 300 parts by weight per million parts of composition. They are further useful for the control of mammal-infesting pests such as ticks and stable flies. Good control of ticks may be obtained by spraying cattle with composition containing the amido- and imido- phenyl methylcarbamates of the present invention.

I claim:
1. A methylcarbamate selected from the group consisting of (a) compounds having the formula

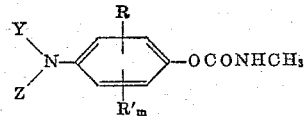

wherein R is selected from the group consisting of hydrogen and alkyl of from 1 to 4 carbon atoms, each R' is independently selected from the group consisting of hydrogen, methyl and ethyl, $m$ is an integer from 1 to 2, inclusive,

represents an acid amido radical consisting of from 1 to 8 carbon atoms, inclusive, wherein said acid amido radical is selected from the group consisting of alkanoylamido, benzoylamido and toluoylamido and (b) compounds having the above noted formula in which

represents an acid imido radical consisting of from 4 to 8 carbon atoms, inclusive, wherein said acid imido radical is selected from the group consisting of phthalimido, succinimido, maleimido, glutarimido, glutaconimido, citraconimido, itaconimido, dimethylmaleimido, ethylmaleimido, methylethylmaleimido and diethylmaleimido.

2. 4-formamido-3,5-xylyl methylcarbamate.
3. 4-acetamido-3,5-xylyl methylcarbamate.
4. 3-tertiary-butyl-4-formamidophenyl methylcarbamate.
5. 3 - tertiary - butyl - 4 - phthalimidophenyl methylcarbamate.

References Cited in the file of this patent
UNITED STATES PATENTS

| | | |
|---|---|---|
| 2,776,197 | Gysin et al. | Jan. 1, 1957 |
| 2,933,383 | Lambech | Apr. 19, 1960 |